United States Patent
Novikov et al.

(10) Patent No.: US 12,413,774 B2
(45) Date of Patent: Sep. 9, 2025

(54) SYSTEM, DEVICES AND/OR PROCESSES FOR ADAPTIVE IMAGE RESOLUTION SCALING

(71) Applicant: Arm Limited, Cambridge (GB)

(72) Inventors: Maxim Novikov, Manchester (GB); Yanxiang Wang, Manchester (GB); Ignazio Indovina, Manchester (GB); Daren Croxford, Swaffham Prior (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/823,444

(22) Filed: Aug. 30, 2022

(65) Prior Publication Data
US 2024/0073449 A1   Feb. 29, 2024

(51) Int. Cl.
*H04N 11/02* (2006.01)
*G06T 5/70* (2024.01)
*G06T 7/11* (2017.01)
*G06V 10/44* (2022.01)
*H04N 19/176* (2014.01)
*H04N 19/59* (2014.01)

(52) U.S. Cl.
CPC ............ *H04N 19/59* (2014.11); *G06T 5/70* (2024.01); *G06T 7/11* (2017.01); *G06V 10/44* (2022.01); *H04N 19/176* (2014.11); *G06T 2207/30168* (2013.01)

(58) Field of Classification Search
CPC ........................................................ H04N 19/59
USPC ....................................... 375/240.01–240.29
See application file for complete search history.

(56) References Cited

U.S. PATENT DOCUMENTS

| | | | |
|---|---|---|---|
| 2008/0219654 A1* | 9/2008 | Border | H04N 23/673 396/89 |
| 2011/0149098 A1* | 6/2011 | Ahn | H04N 5/2621 348/222.1 |
| 2014/0152886 A1* | 6/2014 | Morgan-Mar | H04N 5/2226 348/349 |
| 2017/0339431 A1* | 11/2017 | Zhang | H04N 19/513 |
| 2019/0034716 A1* | 1/2019 | Kamarol | G06V 10/764 |
| 2019/0385288 A1* | 12/2019 | Stewart | G06T 5/70 |

* cited by examiner

*Primary Examiner* — Leron Beck
(74) *Attorney, Agent, or Firm* — Berkeley Law & Technology Group, LLP

(57) ABSTRACT

Example methods, apparatuses, and/or articles of manufacture are disclosed that may implement, in whole or in part, techniques to process portions of an image frame according to a level of diminished signal information. Portions of an image frame experiencing diminished signal information may be sampled a lower rate/more sparsely to reduce impacts to downstream image processing resources.

20 Claims, 5 Drawing Sheets

SYSTEM, DEVICES AND/OR PROCESSES FOR ADAPTIVE IMAGE RESOLUTION SCALING

BACKGROUND

1. Field

Techniques, devices and processes for processing images captured at an imaging device are described.

2. Information

Imaging devices typically capture images at a set resolution based, at least in part, on a density of pixels formed on particular imaging devices. Downstream processes to produce an image frame based on such captured images may be scaled according to the set resolution of the captured images.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
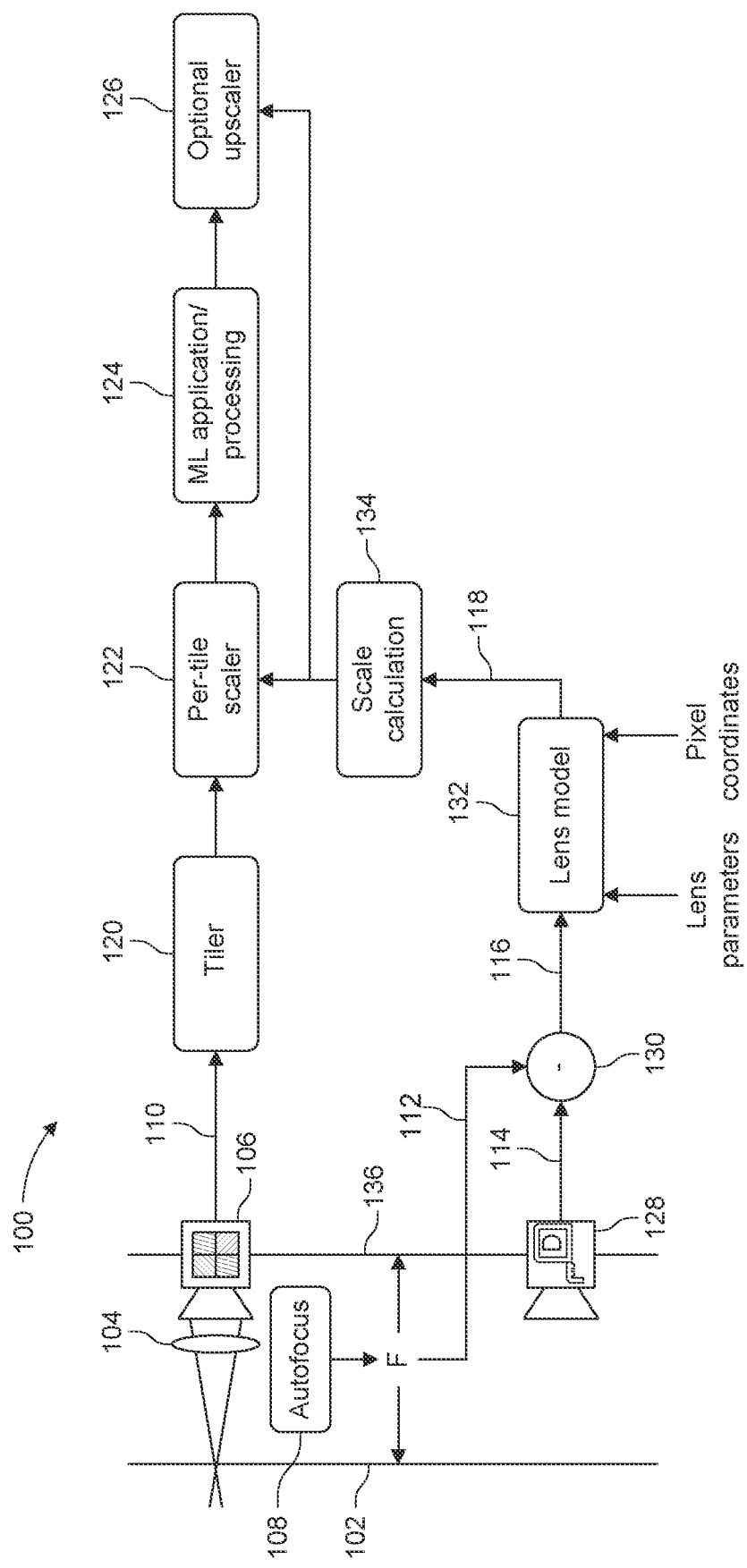
FIG. 1 is a schematic diagram of a system for processing images captured at an imaging device according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, a time varying or spatially varying analog signal may be sampled at a particular temporal or spatial frequency to provide corresponding digital representations of the analog signal. Under the so-called Nyquist-Shannon theorem, given certain spatial and/or temporal characteristics of such an analog signal, the analog signal may be losslessly recovered from such a digital representation if a spatial and/or temporal sample rate is sufficiently high.

While images captured at an imaging device may be captured at a set resolution (e.g., based, at least in part, on a pixel density), in practice a distance between a subject/object and focal plane, as well as application of particular geometric distortion correction algorithms may result in different areas of a captured image having different frequency components. Recovery of particular areas in an image resulting in a relatively low spatial frequency may not benefit from a spatial sample rate that is sufficiently high to losslessly recover different areas in the image having a relatively high spatial frequency.

To facilitate auto-focus and other function, imaging systems often employ depth sensors. According to an embodiment, signals/measurements obtained from depth sensors deployed in an imaging system, along with auto-focus parameters, a lens model and/or geometric distortion model, may be used to identify portions of an image for which full resolution processing provides little or no benefit. For these portions of an image experiencing distortion (e.g., geometric distortion or out-of-focus distortion), a lower-scale processing may be applied with little or no loss in resulting image quality.

Briefly, one particular implementation is directed to a method comprising: capturing an image at an imaging device; identifying portions of the captured image having diminished signal information based, at least in part, on one or more signals indicative of limited spatial frequency. By reducing a sampling in portions of an image determined to have diminished signal information, overall processing/computing resources to process the image may be reduced with little or no reduction in resulting image quality.

FIG. 1 is a schematic diagram of a system 100 for processing images captured at an imaging device 106 according to an embodiment. A lens 104 may transmit light from objects in a camera field of view to a focal plane 136 of an imaging array. Such an imaging array may comprise a mosaic of photodetectors formed on an imaging surface to detect/measure signal intensities associated with color channels at pixel locations in the imaging array. In a particular implementation, such an imaging surface may be formed on a substrate as a complementary metal oxide semiconductor (CMOS) device having formed thereon an array of photodiodes that are responsive to impinging light energy. In one embodiment, light filters or "masks" may be formed over such photodiodes to form red, blue and green pixels of a so-called Bayer pattern pixel array. In another embodiment, an imaging surface may also detect, at least one non-visible (e.g. infra-red, or ultraviolet), or visible light. In an embodiment, energy collected at such photodiodes may be sampled as voltage and/or current samples that express and/or represent an intensity of light of particular color frequency bands at particular pixel locations over an exposure interval (e.g., frame interval).

An autofocus operation 108 may mechanically position lens 104 between an object in a field of view and a focal plane 136 to bring one or more objects within a camera field view into focus. For example, autofocus operation 108 may mechanically position lens 104 to adjust a focal distance F so as to bring an object into focus on focal plane 136. Autofocus function 108 may position lens 104 to bring an object into focus based, at least in part, on measurements obtained by a depth sensor 128. Depth sensor 128 may comprise any one of several types of active or passive sensing technologies such as, for example, infrared, time-of flight sensing (e.g., radar and/or lidar), stereoscopic imaging, just to mention a few examples. If a depth sensor 128 is to be used, sensor data collected by depth sensor 128 and image signal intensity values captured by imaging device may not be aligned (e.g., not coincident). According to an embodiment, such a misalignment of data collected by depth sensor 128 and image signal intensity values captured by imaging device may be compensated using, for example, a transformation matrix incorporating relative rotational and/or translational parameters.

According to an embodiment, imaging device 106 may comprise an image signal processor (ISP) (not shown) for processing signals received from photodetectors on an imaging surface to provide image frames 110 formatted according to a pixel dimension. For example, an image frame 110 may define one or more image signal intensity value for associated pixel locations according to a monochromatic or multi-color channel format (e.g., red, blue green color channels). In a particular implementation, an ISP of imaging device may perform one or more image processing functions such as auto-focus, noise reduction, super-resolution, auto-exposure, auto-white balance and/or color interpolation, just to provide a few example operations that may be performed by an ISP in imaging device 106.

According to an embodiment, tiler 120 may partition and/or deconstruct image frames 100 into "tiles" to enable further processing of an image frame to be localized on a per tile basis. Such a tile may cover a set grouping of contiguous pixel locations in an image frame and may cover pixel locations of the image frame within a rectangular and/or polygonal boundary. It should be understood, however, that these are mere example of how a tile may be implemented, and claimed subject matter is not limited in this respect.

According to an embodiment, a machine-learning image processing operation 124 may apply image processing operations individually to tiles defined by tiler 120. Such image processing operations applied by machine-learning image processing operation 124 may include, for example, detection operations, classification operations, enhancement operations (e.g., super-resolution or bokeh effects), just to provide a few examples. In a particular implementation, machine-learning image processing operation 124 may execute computationally intensive algorithms including, for example, large convolutional neural networks (CNNs) to process image signal intensity values associated with pixel locations of individual tiles based on weights determined in training operations. It should be understood, however, that this merely an example of how image processing for individual image tiles may be implemented, and claimed subject matter is not limited in this respect.

According to an embodiment, operations of machine-learning image processing operation 124 may be scaled to a size of a tile or image frame being processed. For example, machine-learning image processing operation 124 may comprise a CNN to receive image signal intensity values associated with pixel locations of a tile as an input tensor. Likewise, such a CNN may provide image signal intensity values associated with pixel locations of a processed tile as an output tensor. Here, a tile covering a larger number of pixels (and associated image signal intensity values) may impart larger input and/or output tensors while a tile covering a smaller number of pixels may impart smaller input and/or output tensors. As such, execution of machine-learning image processing operation 124 may be more computationally intensive (e.g., consuming more memory, power and/or processor resources) to process tiles covering a larger number of pixel locations than tiles covering a smaller number of pixel locations.

In one particular implementation, application of processing to a tile provided by tiler 120 may have a theoretical lower maximum spatial frequency (e.g., the tile is in an out of focus portion of a captured image frame). Here, a denoising operation may be greatly simplified by application of a low pass filter while bypassing other aspects of a denoising operation to be applied to other tiles having a theoretical higher maximum spatial frequency.

As pointed out above, distortion in certain portions of an image frame 110 may arise from certain phenomena such as geometric distortions and/or being out of focus. According to an embodiment, for tiles defined by tiler 120 affected by such distortion, processing at machine-learning image processing operation 124 may be reduced and/or downscaled without significant loss in performance (e.g., image quality, detection/classification performance, etc.). According to an embodiment, per-tile scaler 122 may selectively rescale individual tiles defined by tiler 120 based, at least in part, on a scale factor provided by scale calculation operation 134. For example, for a tile covering a particular number of pixel locations over an area in an image frame 110, per-tile scaler 122 may transform and/or map image signal intensity values to a smaller number of pixels covering the same area (e.g., with a lower resolution) based, at least in part, on a scaling factor determined by scale calculation 134. Some embodiments may employ one or more downscaling functions (e.g., nearest neighbour, bilinear, bicubic, adaptive bicubic, etc.) depending upon a degree of downscaling and/or quality desired. In one implementation, an ISP may have a predefined set of downscaled outputs for associated applications and a particular downscaled output that most closely matches a scale calculation may be selected. While the particular implementation of system 100 shows per-tile scaler 122 to be separate from imaging device 106, in other implementations an ISP integrated with imaging device 106 may include a scaler function (e.g., to generate differently scaled tile outputs), obviating a need for a separate scaling operation and reducing computation.

According to an embodiment, lens model operation 132 may determine image quality map 118 for a particular image captured at imaging device 106 based, at least in part, parameters referenced to a time instance at which the image was captured. Such parameters may comprise, for example, a focal area and/or lens position, depth map 114 obtained from depth sensor 128. In one particular implementation, image quality map 118 may comprise a blur map indicating degrees to which particular portions in an image are experiencing blur. In another particular implementation, lens model 132 may compute a portion of a image quality map 118 associated with a tile based, at least in part, on a measured distance 116 that an object(s) in the tile is from plane of focus 102. As shown, such a measured distance 116 may be computed as a function of measured depth expressed in depth map 114 (e.g., based on measurements obtained from depth sensor 128) and autofocus parameters or fixed focal distance if known. In one example, this may be determined as a difference between a measured depth and focal distance calculated based on autofocus parameters.

Optionally, lens model operation 132 may receive all or portions of a depth map (e.g., for computation of image quality map 118) based, at least in part, on depth estimates obtained from a dynamic focusing system (not shown) and/or monocular depth estimation techniques. In a particular implementation, depth estimation may be performed at a lower image resolution using a neural network trained to estimate with minimal depth from focus in lieu of other traditional depth estimation techniques. Additionally, if computational photography introducing blur (e.g., Bokeh and/or portrait mode) is to be applied to a portion of a captured image frame, knowledge of application of this effect may be used for determining an associated portion of image quality map 118 (e.g., to be used in computing an associated scaling factor for associated tile).

In another embodiment, lens model operation 132 may determine image quality map 118 for a particular image captured at imaging device 106 based, at least in part, on identified geometric distortions. In a particular implementation, imaging device 106 may apply a geometric distortion correction engine to preserve an original resolution in a portion of a captured image frame (e.g., center of image and/or other portion of image covering object(s) of interest) while upscaling (e.g., increasing resolution without increasing information of) other regions of the frame (e.g., edges). In an implementation, for such portions of a captured image to be downscaled, lens model operation 132 may affect an associated portion of image quality map 118.

While system 100 shows lens model determining image quality map 118 based on inputs received from an image capture system including autofocus operation 108 and depth sensor 128, in a particular optional implementation portions of image quality map 118 may be determined according to a target lens model independently of inputs from such an image capture system. Also, while system 100 shows that identification of out of focus portions of may be performed at a single lens model operation 132, in other implementations effects of distortion arising from objects being out of focus and geometric distortion may be assessed in separate operations. For example, such separate operations may independently determine an image quality map to be processed by scale calculation operation 134 for determining scaling factors for tiles in an image frame.

Figure 2:
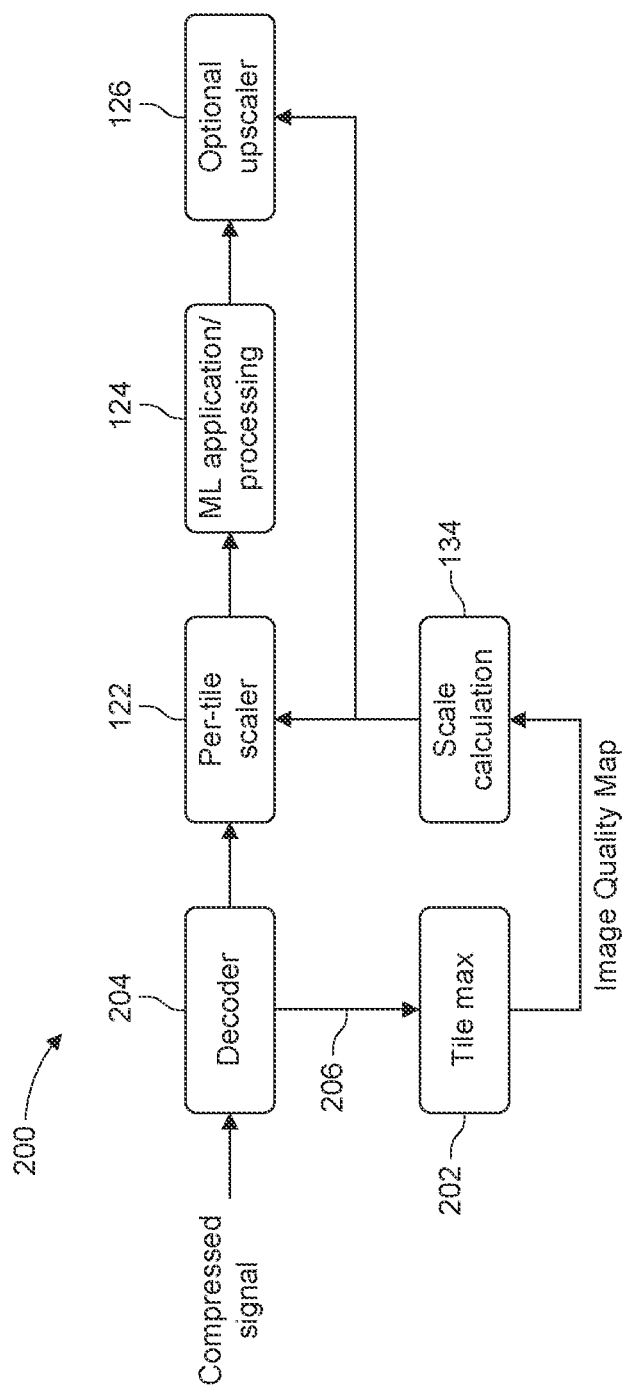
FIG. 2 is a schematic diagram of a system for processing images according to an embodiment.

FIG. 2 is a schematic diagram of a system 200 for processing decompressed images according to an embodiment. Here, tiles of an image frame may be provided by decoder 204 based, at least in part, on one or more signals to express the image frame in any one of several compression formats (e.g., JPEG), for example. In a particular implementation, signals decompressed at decoder 204 may be associated with defocus maps that may have been used in a lossy compression to optimize compression parameters and/or block sizes. According to an embodiment, decoder 204 may determine one or more defocus maps in a decompressed signal indicative of portions of a decompressed image frame that had been defocused (e.g., to optimize compression). Based, at least in part, on the one or more defocus maps, decoder 204 may determine a maximum spatial frequency 206 per block and/or per tile be provided to tile max operation 202. Based, at least in part, on a maximum spatial frequency 206, tile max operation 202 may then compute an image quality map associated with tiles in a decompressed image frame to enable scale calculation operation 134 to compute a scale factor per tile as discussed above. In one particular implementation, a method to decompress a compressed signal received at decoder 204 may operate in a spatial frequency domain such that per-block information regarding a highest frequency may be extracted from compressed blocks (e.g., to be applied in low-pass filtering to reduce blockiness and/or banding).

Figure 3:
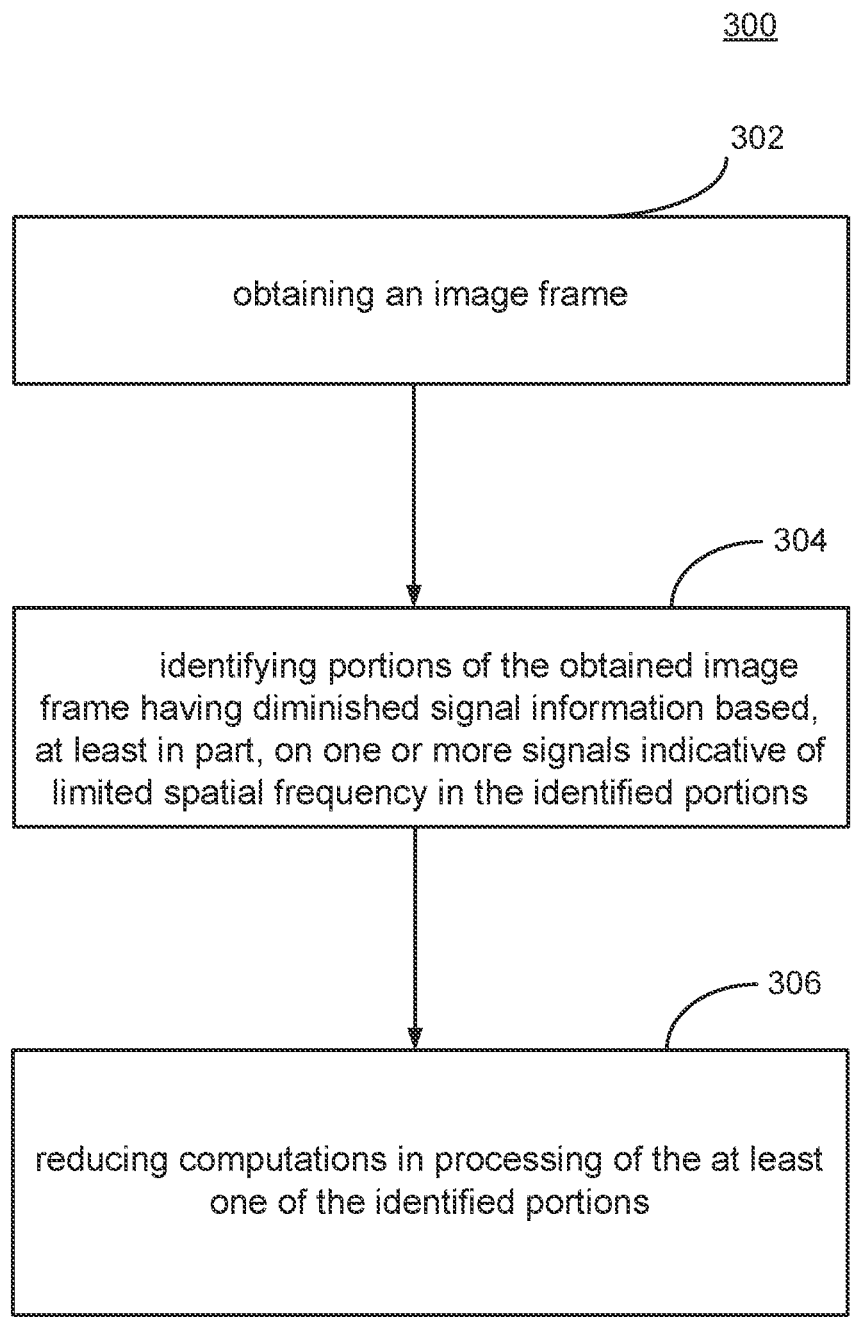
FIG. 3 is a flow diagram of a process to process images captured at an imaging device, according to an embodiment.

FIG. 3 is a flow diagram of a process 300 to be applied to images captured at an imaging device, according to an embodiment. Block 302 may comprise obtaining an image frame comprising multi-color channel or monochrome image signal intensity value associated with pixel locations of an array of pixels defining the image frame according to a particular format. In one particular implementation, such an image frame may be obtained from capturing at processing an image captured at imaging device 106. In another particular implementation, such an image frame may be obtained from decoding a compressed image signal formatted in blocks, for example. It should be understood, however, that these are merely examples of how an image frame may be obtained, and claimed subject matter is not limited in this respect.

Block 304 may comprise identifying portions of an image frame at block 302 having diminished signal information based, at least in part, on one or more signals indicative of limited spatial frequency in the identified portions. In one aspect, such a diminishment of signal information may arise from sources of distortion as identified above (e.g., portion of image being out of focus, or geometric distortion). It should be understood, however, that this is merely an example of how signal information in a portion of an image may be diminished, and claimed subject matter is not limited in this respect. As pointed out above, an image frame may be segmented into tiles to enable application of localized processing to different portions of the image frame. As pointed out above, distortions in these tiles may be manifested in a lower spatial frequency arising from camera parameters and/or lossy image compression/decoding. As discussed with regard to system 100 shown in FIG. 1, such a lower spatial frequency may be determined based, at least in part, on depth measurements and autofocus parameters. As discussed with regard to system 200 shown in FIG. 2, such a lower spatial frequency may be determined based, at least in part, on parameters obtained from an image signal compressed in blocks.

According to an embodiment, signals indicative of limited spatial frequency in an identified portion of an image frame make comprise auto-focus parameters, parameters indicative of a lens model, parameters indicative of a geometric distortion model or depth sensor parameters, or a combination thereof. In a particular implementation, such a lens model and/or parameters indicative of a geometric distortion model may be based on a model of a physical lens to capture an obtained image frame or a model of a computed target lens based on application of an effect (e.g., a bokeh effect), or a combination thereof.

For further processing of an image frame obtained at block 302, image signal intensity values associated with pixel locations may be sampled for further processing by, for example, applying denoising, feature detection, feature classification or image enhancement, just to mention a few examples of how image signal intensity values of an image frame may be processed. Block 306 may comprise reducing computations to be performed in processing an image frame obtained at block 302. For example, block 306 may comprise reducing a spatial sampling of image signal intensity values in at least one portion identified in block 304. Such a spatial sampling may be reduced, for example, by reducing a rate of spatial sampling image signal of image signal intensity value resulting in a reduced number of samples obtained over a tile. In one embodiment, lower-resolution tiles in low-frequency regions may be employed. In one implementation, to reduce spatial resolution by a factor of two, application of a low-pass filter may be followed by a discard of every second pixel. In another implementation, the same tile dimension may be maintained (e.g., 32×32 pixels) while tiles are obtained from a downsampled image (e.g., 32×32 pixel tile dimension is to cover an effective area of 64×64 pixels in full resolution image). In one particular implementation, reduction in a spatial sampling of a portion of an image may, in some circumstances, impact and/or reduce image quality in the portion of the image. For example, reduction in a spatial sampling of a portion of an image experiencing minimal distortion (e.g., in focus portion of image) may reduce image quality over the portion of the image. Conversely, the same reduction in spatial sampling of a portion of the image experiencing substantial distortion (e.g., from being out of focus) may not significantly further degrade image quality in that portion of the image.

According to an embodiment system 100 and/or 200 may be formed by and/or expressed in transistors and/or lower metal interconnects (not shown) in processes (e.g., front end-of-line and/or back-end-of-line processes) such as processes to form complementary metal oxide semiconductor (CMOS) circuitry, just as an example. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process (e.g., wafer fabrication process).

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

For one or more embodiments, system 100 or 200 may be implemented in a device, such as a computing device and/or networking device, that may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format).

Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

Figure 4:
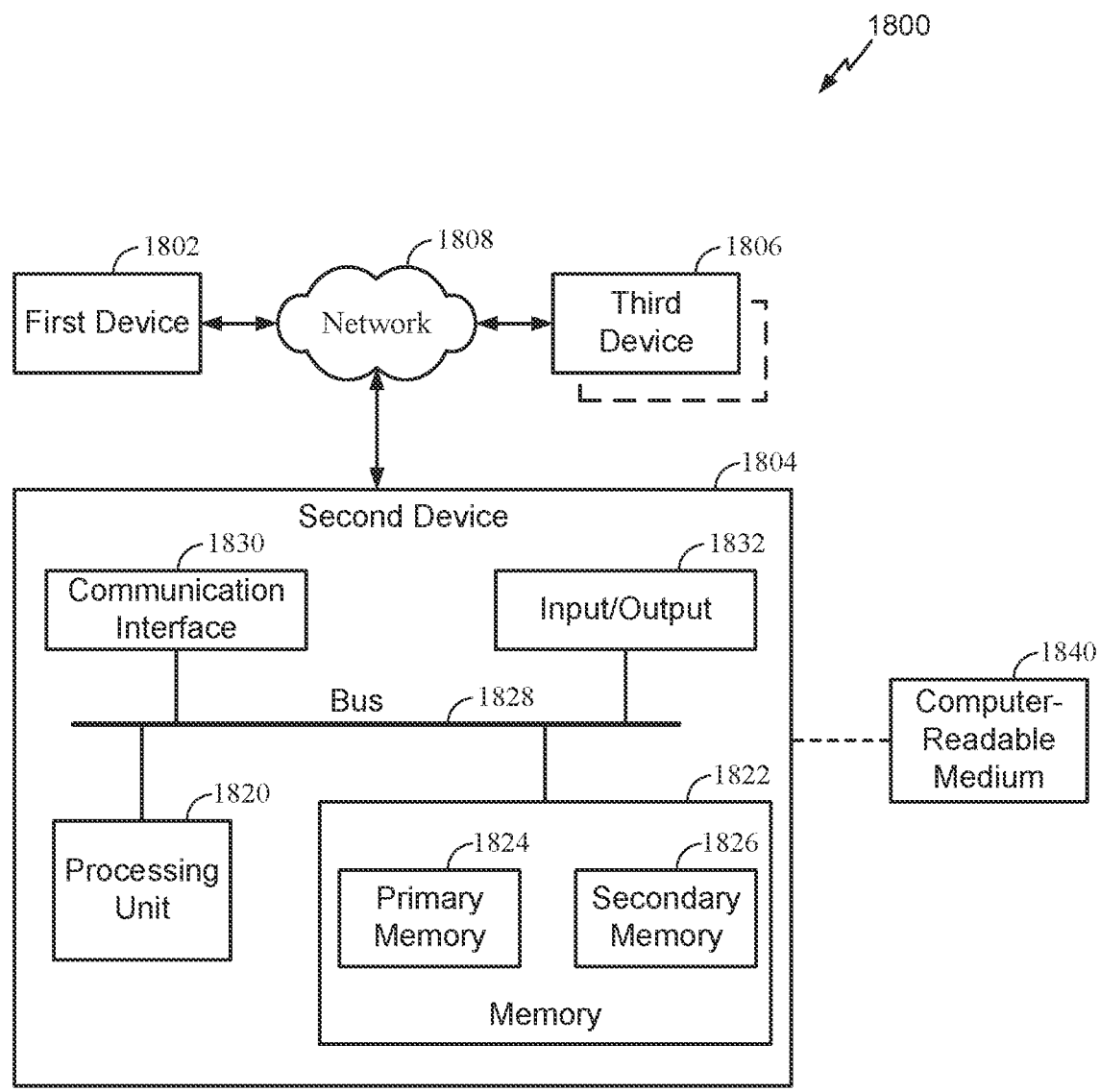
FIG. 4 an example computing system in accordance with an implementation.

FIG. 4 shows an embodiment 1800 of a system that may be employed to implement either type or both types of networks. Network 1808 may comprise one or more network connections, links, processes, services, applications, and/or resources to facilitate and/or support communications, such as an exchange of communication signals, for example, between a computing device, such as 1802, and another computing device, such as 1806, which may, for example, comprise one or more client computing devices and/or one or more server computing device. By way of example, but not limitation, network 1808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 4 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), image signal processor (ISP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1 through 3 and in the text associated with the foregoing figure(s) of the present patent application.

Referring now to FIG. 4, in an embodiment, first and third devices 1802 and 1806 may be capable of rendering a graphical user interface (GUI) for a network device and/or a computing device, for example, so that a user-operator may engage in system use. Device 1804 may potentially serve a similar function in this illustration. Likewise, in FIG. 4, computing device 1802 ('first device' in figure) may interface with computing device 1804 ('second device' in figure), which may, for example, also comprise features of a client computing device and/or a server computing device, in an embodiment. Processor (e.g., processing device) 1820 and memory 1822, which may comprise primary memory 1824 and secondary memory 1826, may communicate by way of a communication bus 1815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1804, as depicted in FIG. 4, is merely one example, and claimed subject matter is not limited in scope to this particular example. FIG. 4 may further comprise a communication interface 1830 which may comprise circuitry and/or devices to facilitate transmission of messages between second device 1804 and first device 1802 and/or third device 1806 in a physical transmission medium over network 1808 using one or more network communication techniques identified herein, for example. In a particular implementation, communication interface 1830 may comprise a transmitter device including devices and/or circuitry to modulate a physical signal in physical transmission medium according to a particular communication format based, at least in part, on a message that is intended for receipt by one or more recipient devices. Similarly, communication interface 1830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, GNSS receiver and/or other location-identifying type capability, and/or a display with a higher degree of functionality, such as a touch-sensitive color 5D or 3D display, for example.

In FIG. 4, computing device 1802 may provide one or more sources of executable computer instructions in the form physical states and/or signals (e.g., stored in memory states), for example. Computing device 1802 may communicate with computing device 1804 by way of a network connection, such as via network 1808, for example. As previously mentioned, a connection, while physical, may not necessarily be tangible. Although computing device 1804 of FIG. 4 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 may comprise any non-transitory storage mechanism. Memory 1822 may comprise, for example, primary memory 1824 and secondary memory 1826, additional memory circuits, mechanisms, or combinations thereof may be used. Memory 1822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1822 may be utilized to store a program of executable computer instructions. For example, processor 1820 may fetch executable instructions from memory and proceed to execute the fetched instructions. Memory 1822 may also comprise a memory controller for accessing device readable-medium 1840 that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a network, for example, as previously described. Generated signals may also be stored in memory, also previously suggested.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 4, processor 1820 may comprise one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 1820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 4 also illustrates device 1804 as including a component 1832 operable with input/output devices, for example, so that signals and/or states may be appropriately communicated between devices, such as device 1804 and an input device and/or device 1804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

According to an embodiment, a neural network may comprise a graph comprising nodes to model neurons in a brain. In this context, a "neural network" as referred to herein means an architecture of a processing device defined and/or represented by a graph including nodes to represent neurons that process input signals to generate output signals, and edges connecting the nodes to represent input and/or output signal paths between and/or among neurons represented by the graph. In particular implementations, a neural network may comprise a biological neural network, made up of real biological neurons, or an artificial neural network, made up of artificial neurons, for solving artificial intelligence (AI) problems, for example. In an implementation, such an artificial neural network may be implemented by one or more computing devices such as computing devices including a central processing unit (CPU), graphics processing unit (GPU), digital signal processing (DSP) unit and/or neural processing unit (NPU), just to provide a few examples. In a particular implementation, neural network weights associated with edges to represent input and/or output paths may reflect gains to be applied and/or whether an associated connection between connected nodes is to be excitatory (e.g., weight with a positive value) or inhibitory connections (e.g., weight with negative value). In an example implementation, a neuron may apply a neural network weight to input signals, and sum weighted input signals to generate a linear combination.

According to an embodiment, edges in a neural network connecting nodes may model synapses capable of transmitting signals (e.g., represented by real number values) between neurons. Responsive to receipt of such a signal, a node/neural may perform some computation to generate an output signal (e.g., to be provided to another node in the neural network connected by an edge). Such an output signal may be based, at least in part, on one or more weights and/or numerical coefficients associated with the node and/or edges providing the output signal. For example, such a weight may increase or decrease a strength of an output signal. In a particular implementation, such weights and/or numerical coefficients may be adjusted and/or updated as a machine learning process progresses. In an implementation, transmission of an output signal from a node in a neural network may be inhibited if a strength of the output signal does not exceed a threshold value.

Figure 5:
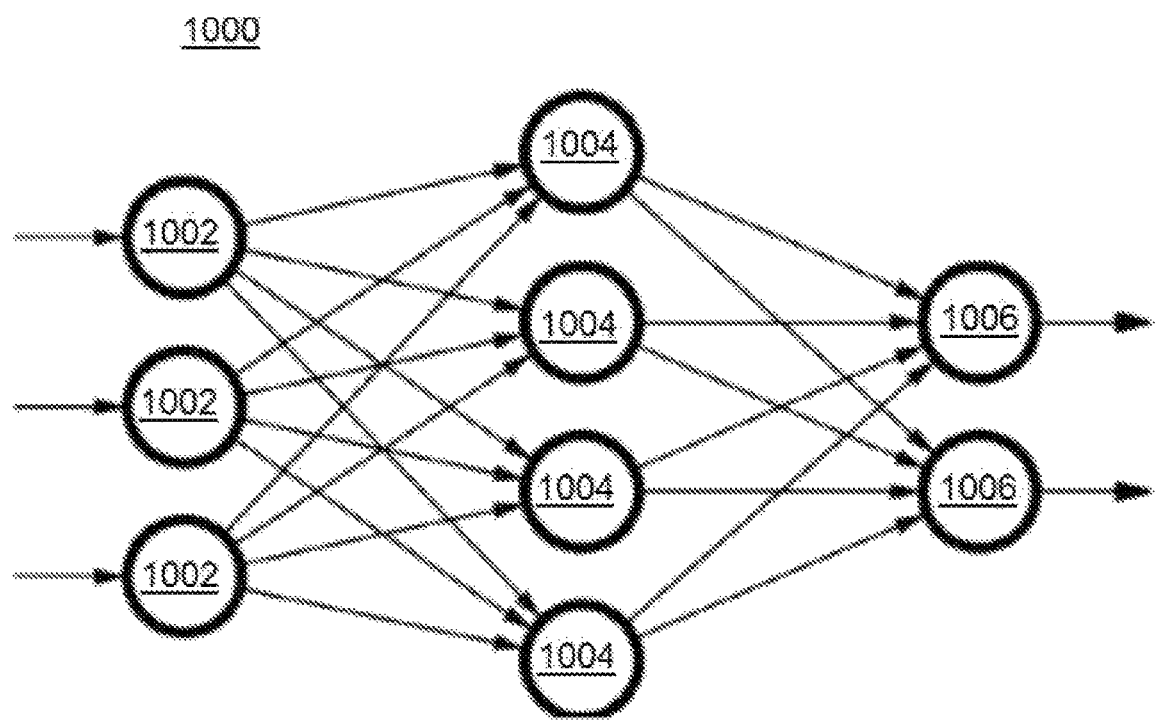
FIG. 5 is a schematic diagram of a neural network formed in "layers", according to an embodiment.

FIG. 5 is a schematic diagram of a neural network 1000 formed in "layers" in which an initial layer is formed by nodes 1002 and a final layer is formed by nodes 1006. All or a portion of features of NN 1000 may be implemented in aspects of machine-learning image processing operation 124, for example. Neural network (NN) 1000 may include an intermediate layer formed by nodes 1004. Edges shown between nodes 1002 and 1004 illustrate signal flow from an initial layer to an intermediate layer. Likewise, edges shown between nodes 1004 and 1006 illustrate signal flow from an intermediate layer to a final layer. While neural network 1000 shows a single intermediate layer formed by nodes 1004, it should be understood that other implementations of a neural network may include multiple intermediate layers formed between an initial layer and a final layer.

According to an embodiment, a node 1002, 1004 and/or 1006 may process input signals (e.g., received on one or more incoming edges) to provide output signals (e.g., on one or more outgoing edges) according to an activation function. An "activation function" as referred to herein means a set of one or more operations associated with a node of a neural network to map one or more input signals to one or more output signals. In a particular implementation, such an activation function may be defined based, at least in part, on a weight associated with a node of a neural network. Operations of an activation function to map one or more input signals to one or more output signals may comprise, for example, identity, binary step, logistic (e.g., sigmoid and/or soft step), hyperbolic tangent, rectified linear unit, Gaussian error linear unit, Softplus, exponential linear unit, scaled exponential linear unit, leaky rectified linear unit, parametric rectified linear unit, sigmoid linear unit, Swish, Mish, Gaussian and/or growing cosine unit operations. It should be understood, however, that these are merely examples of operations that may be applied to map input signals of a node to output signals in an activation function, and claimed subject matter is not limited in this respect. Additionally, an "activation input value" as referred to herein means a value provided as an input parameter and/or signal to an activation function defined and/or represented by a node in a neural network. Likewise, an "activation output value" as referred to herein means an output value provided by an activation function defined and/or represented by a node of a neural network. In a particular implementation, an activation output value may be computed and/or generated according to an activation function based on and/or responsive to one or more activation input values received at a node. In a particular implementation, an activation input value and/or activation output value may be structured, dimensioned and/or formatted as "tensors". Thus, in this context, an "activation input tensor" as referred to herein means an expression of one or more activation input values according to a particular structure, dimension and/or format. Likewise in this context, an "activation output tensor" as referred to herein means an expression of one or more activation output values according to a particular structure, dimension and/or format.

In particular implementations, neural networks may enable improved results in a wide range of tasks, including image recognition, speech recognition, just to provide a couple of example applications. To enable performing such tasks, features of a neural network (e.g., nodes, edges, weights, layers of nodes and edges) may be structured and/or configured to form "filters" that may have a measurable/numerical state such as a value of an output signal. Such a filter may comprise nodes and/or edges arranged in "paths" and are to be responsive to sensor observations provided as input signals. In an implementation, a state and/or output signal of such a filter may indicate and/or infer detection of a presence or absence of a feature in an input signal.

In particular implementations, intelligent computing devices to perform functions supported by neural networks may comprise a wide variety of stationary and/or mobile devices, such as, for example, automobile sensors, biochip transponders, heart monitoring implants, Internet of things (IoT) devices, kitchen appliances, locks or like fastening devices, solar panel arrays, home gateways, smart gauges, robots, financial trading platforms, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, just to provide a few examples.

According to an embodiment, a neural network may be structured in layers such that a node in a particular neural network layer may receive output signals from one or more nodes in an upstream layer in the neural network, and provide an output signal to one or more nodes in a downstream layer in the neural network. One specific class of layered neural networks may comprise a convolutional neural network (CNN) or space invariant artificial neural networks (SIANN) that enable deep learning. Such CNNs and/or SIANNs may be based, at least in part, on a shared-weight architecture of a convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

Another class of layered neural network may comprise a recursive neural network (RNN) that is a class of neural networks in which connections between nodes form a directed cyclic graph along a temporal sequence. Such a temporal sequence may enable modeling of temporal dynamic behavior. In an implementation, an RNN may employ an internal state (e.g., memory) to process variable length sequences of inputs. This may be applied, for example, to tasks such as unsegmented, connected handwriting recognition or speech recognition, just to provide a few examples. In particular implementations, an RNN may emulate temporal behavior using finite impulse response (FIR) or infinite impulse response (IIR) structures. An RNN may include additional structures to control stored states of such FIR and IIR structures to be aged. Structures to control such stored states may include a network or graph that incorporates time delays and/or has feedback loops, such as in long short-term memory networks (LSTMs) and gated recurrent units.

According to an embodiment, output signals of one or more neural networks (e.g., taken individually or in combination) may at least in part, define a "predictor" to generate prediction values associated with some observable and/or measurable phenomenon and/or state. In an implementation, a neural network may be "trained" to provide a predictor that is capable of generating such prediction values based on input values (e.g., measurements and/or observations) optimized according to a loss function. For example, a training process may employ back propagation techniques to iteratively update neural network weights to be associated with nodes and/or edges of a neural network based, at least in part on "training sets." Such training sets may include training measurements and/or observations to be supplied as input values that are paired with "ground truth" observations. Based on a comparison of such ground truth observations and associated prediction values generated based on such input values in a training process, weights may be updated according to a loss function using backpropagation. In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
obtaining an image frame comprising an image of an object captured at an imaging device from a first signal path;
obtaining one or more signals from a second signal path separate from the first signal path;
identifying portions of the image frame obtained from the first signal path having diminished signal information based, at least in part, on one or more signals indicative of geometric distortions in the identified portions in the one or more signals obtained from the second signal path, the one or more signals indicative of geometric distortions being based, at least in part, on a model of a physical lens to capture the obtained image frame or a model of a computed target lens, or a combination thereof; and
reducing computations in processing of the at least one of the identified portions of the image frame obtained from the first signal path.

2. The method of claim 1, wherein reducing computations in processing of the at least one of the identified portions further comprises reducing a spatial sampling in at least one of the identified portions.

3. The method of claim 1, wherein reducing computations in processing of the at least one of the identified portions comprises reducing computations in a denoising operation, a banding removal operation or an adjustment to compression parameters, or a combination thereof.

4. The method of claim 1, wherein the one or more signals obtained from the second signal path comprise auto-focus parameters, parameters indicative of a lens model, parameters indicative of a geometric distortion model or depth sensor parameters, or a combination thereof.

5. The method of claim 1, wherein the model of a computed target lens based on application of a bokeh effect, or a combination thereof.

6. The method of claim 1, wherein:
obtaining the image frame further comprises decoding a compressed signal formatted in blocks; and
identifying portions of the obtained image frame having diminished signal information comprises determining a highest spatial frequency associated with the blocks.

7. The method of claim 1, wherein:
the obtained image frame is partitioned into tiles; and
identifying portions of the obtained image frame having diminished signal information comprises identifying tiles having the diminished signal information.

8. The method of claim 7, and further comprises:
generating an image quality map based, at least in part on, application of a lens model an estimated distance of an object from focus; and
computing a scale factor for at least one of the tiles based, at least in part, on the image quality map.

9. The method of claim 1, and further comprising:
reducing a spatial sampling in the at least one of the identified portions;
obtaining samples of the at least one of the identified portions according to the reduced spatial sampling; and
including the obtained samples in an activation input tensor to be applied to a neural network.

10. The method of claim 9, and further comprising executing the neural network to apply a denoising operation, feature detection operation, feature classification operation or image enhancement operation, or a combination thereof, based, at least in part, on the activation input tensor.

11. An apparatus comprising:
an image capture device in a first signal path to obtain an image frame comprising an image of an object captured at the image capture device; and
one or more processors to:
obtain one or more signals from a second signal path separate from the first signal path;
identify portions of the image frame obtained from the first signal path having diminished signal information based, at least in part, on one or more signals obtained from the second signal path indicative of geometric distortions in the identified portions, the one or more signals indicative of geometric distortions to be based, at least in part, on a model of a physical lens to capture the image frame or a model of a computed target lens, or a combination thereof; and reduce computations in processing of the at least one of the identified portions of the image frame obtained from the first signal path.

12. The apparatus of claim 11, wherein the one or more processors are further to reduce computations in processing of the at least one of the identified portions based, at least in part, on a reduction in a spatial sampling in at least one of the identified portions.

13. The apparatus of claim 11, wherein the signals indicative of limited spatial frequency comprise auto-focus parameters, parameters indicative of a lens model, parameters indicative of a geometric distortion model or depth sensor parameters, or a combination thereof.

14. The apparatus of claim 11, wherein:
the image frame obtained from the first signal path is to be partitioned into tiles; and
identification of portions of the image having distortions comprises identifying tiles having the diminished signal information.

15. The apparatus of claim 11, wherein the one or more processors are further to:
reduce a spatial sampling in the at least one of the identified portions;
obtain samples of the at least one of the identified portions according to the reduced spatial sampling; and
include the obtained samples in an activation input tensor to be applied to a neural network.

16. An article comprising:
a non-transitory storage medium comprising computer-readable instructions stored thereon which are executable by one or more processors of a computing device to:
obtain an image frame provided by an image capture device in a first signal path;
obtain one or more signals from a second signal path separate from the first signal path;
identify portions of the image frame obtained from the first signal path having diminished signal information based, at least in part, on the one or more signals obtained from the second signal path indicative of identifying geometric distortions in the identified portions, the one or more signals indicative of geometric distortions being based, at least in part, on a model of a physical lens to capture the obtained image frame or a model of a computed target lens, or a combination thereof; and
reduce computations in processing of the at least one of the identified portions of the image frame obtained from the first signal path.

17. The article of claim 16, wherein the instructions are further executable by the one or more processors to reduce computations in processing of the at least one of the identified portions based, at least in part, on a reduction in a spatial sampling in at least one of the identified portions.

18. The article of claim 16, wherein the signals indicative of limited spatial frequency comprise auto-focus parameters, parameters indicative of a lens model, parameters indicative of a geometric distortion model or depth sensor parameters, or a combination thereof.

19. The article of claim 16, wherein the instructions are further executable by the one or more processors to:
obtain the image frame based, at least in part, on a decoded compressed signal formatted in blocks; and
identify portions of the obtained image frame having diminished signal information based, at least in part, on a determination of a highest spatial frequency associated with the blocks.

20. The article of claim 19, wherein:
the obtained image frame is partitioned into tiles; and
the instructions are further executable by the one or more processors to:
identify portions of the obtained image having diminished signal information comprises identifying tiles having the diminished signal information;
generate an image quality map based, at least in part on, application of a lens model an estimated distance of an object from focus; and
compute a scale factor for at least one of the tiles based, at least in part, on the image quality map.

\* \* \* \* \*